United States Patent Office 3,454,955
Patented July 8, 1969

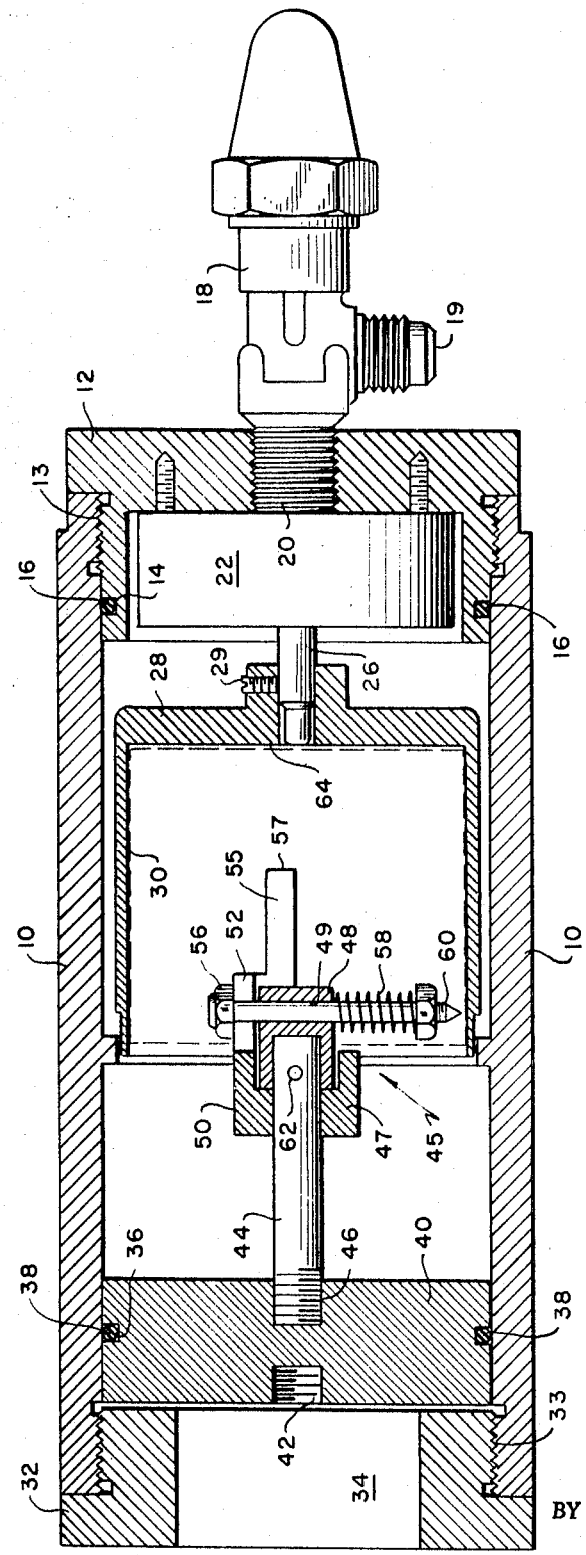

3,454,955
MECHANICAL PRESSURE SENSOR-RECORDER
Ralph P. Crist, Harrisburg, Pa., assignor to the United States of America as represented by the Secretary of the Navy
Filed Oct. 24, 1967, Ser. No. 677,793
Int. Cl. G01d 9/12
U.S. Cl. 346—72                                     5 Claims

ABSTRACT OF THE DISCLOSURE

A self-contained mechanical pressure sensor and recorder which has a mechanically rotated recording drum and a piston, acted upon on one side by the test pressure and upon the other side by a reference pressure established within the housing. A recording pen attached to the piston produces a time-pressure record of the difference between the test pressure and the reference pressure.

---

The invention described herein may be manufactured and used by or for the Government of the United States of America for governmental purposes without the payment of any royalties thereon or therefor.

Background of the invention

This invention relates to mechanical pressure recorders and in particular to a combined pressure sensor and recorder type adapted to measure deviations of pressure about a predetermined reference pressure and providing a quick and easy means for changing the reference pressure.

The prior devices have generally used mechanical biasing of the sensor to establish the reference point about which the deviations are to be measured. This biasing means is usually some form of mechanical spring. The disadvantage of spring biasing is that in order to change the reference point it is necessary to change biasing springs thus the number of reference points available to the operator is limited by the number of different springs available. In some devices this bias spring is provided with an adjustment mechanism for varying the bias force. In this case the adjustable range of bias is inherently limited. Further, changes in spring rate due to aging of the spring material or metal fatigue requires frequent calibration of the device to ensure accuracy of measurement.

In the invention described herein the sensing element is a piston exposed on one side to the fluid to be measured and on its opposing side to the internal pressure of the instrument housing. A bias force is provided on the piston by introducing gas at the reference pressure into the body of the housing by means of a valve at one end thereof.

Summary of the invention

The invention described herein provides a simple inexpensive and durable mechanical recorder which is completely self contained requiring no outside connections. There is provided a recording drum driven by a clock mechanism and mounted for rotation at one end of the housing. At the opposite end of the housing a pressure sensing piston is mounted such that its outside face is exposed to the pressure to be measured. There is attached to the piston a recording pen which is in contact with the recording surface of the drum. When the test pressure outside the housing exceeds the bias pressure the pen moves along the drum thus creating a time pressure chart of the test pressure.

It is therefore an object of this invention to provide a simple mechanical pressure recorder.

It is a further object of this invention to provide a mechanical pressure recorder having a novel means for introducing the bias pressure on the sensor.

Other objects and many of the attendant advantages of this invention will be readily appreciated as the same becomes better understood by reference to the following detailed description when considered in connection with the accompanying drawings wherein:

The figure is a cross sectional view through the assembled recorder.

Description of the preferred embodiment

There is shown in the drawing a cylindrical metal housing 10, closed on one end by end plate 12 which is secured in the housing by means of threads 13. There is provided in this end plate a peripheral groove 14 into which is inserted an O ring 16 providing an airtight seal between the housing and the end plate. Attached to the end plate 12, exterior to the housing, is a pressure fitting 18 which is threaded into end plate 12 and provides an air passage through fitting 19 and opening 20 communicating with the inside chamber of said housing. Attached to the end plate 12 is a clock mechanism 22 of any suitable well known construction having an output shaft 26. Attached to the shaft 26 by means of set screw 29 is a hollow cylindrical recording drum 28. The inner surface of drum 28 provides a writing surface for making the required recording. This surface may be treated so as to record directly on the surface or may be provided with a paper insert 30 (indicated by broken line) upon which the recording may be made.

The opposite end of housing 10 is closed by a second end plate 32 attached to the housing by threads 33. There is further provided in end plate 32 an opening 34 communicating between the atmosphere and the inner chamber of housing 10. Adjacent end plate 32 there is provided a piston 40 slidably mounted within housing 10. The piston is further provided with a peripheral groove 36 and an O ring 38 for accomplishing a seal between the piston and the housing. On both the internal and external surfaces of piston 40 are tapped holes 42 and 46. Attached to piston 40 by means of tapped hole 46 is a rod 44 having attached to the outer end thereof the marking instrument 45.

The marking instrument comprises mounting block 48 which is attached to rod 44 by means of a roll pin 62. A stylus pen 60 is slidably mounted in the mounting block through hole 49 and is urged toward the recording surface by means of spring 58. The pen is secured by means of nut 56. There is further provided a latch member 47 slidably mounted on rod 44. Pin 60 extends through the latch plate at slot 52.

The assembly and operation of the recorder is as follows:

End plates 12 and 32 with their attached component parts are removed from the housing. Piston 40, with the marker assembly attached, is removed from the housing. The marker pen is placed in the restrained retracted position in the following manner: With latch plate 47 moved away from the marker 60 toward the piston 40 the pen is forced upward against spring 58 until nut 56 is above the top surface 50 of the latch plate 47. The latch plate is then slid forward so that pen 60 engages in slot 52 of the latch plate and under nut 56 thus maintaining the pen in a raised position. Piston 40 is then reinserted in the housing and end plate 32 is threaded into place. End plate 12 and its attached components are prepared for assembly by rotating the recording drum 28, to wind the clock mechanism 22. The end plate is then threaded into the housing and sealed as shown.

To engage pen 60 with the writing surface of the drum 28 a threaded rod similar to the rod 44 is threaded into hole 42 in the piston 40. The piston is then manually force toward the drum 28 until the end surface 57 of the latch plate 47 contacts the inner surface 64 of the drum. The piston is then pushed forward so as to force the latch plate toward the piston thus allowing nut 56 to disengage surface 50 and causing the pen to contact the writing surface of the drum by means of the force exerted on the pen by spring 58. The piston and the pen are then retracted back to the position adjacent end plate 32. The recorder is then connected to a source of pressurized fluid at pressure fitting 18 and the internal chamber of housing 10 is adjusted to the desired reference pressure and the recorder is ready for operation.

With the recording drum 28 being rotated by the clock 22 and the pen 60 in contact with the recording surface, the device may then be immersed in the fluid in which the pressure is to be measured. The ambient pressure of the fluid acts on the outer surface of the piston 40 through opening 34. The ambient pressure is opposed by the reference pressure in the housing acting on the internal surface of piston 40. When the pressure at opening 34 exceeds the reference pressure within the housing the piston 40, and its attached pen 60, moves toward end plate 12 thus scribing upon the recording surface a record of time versus pressure in excess of the reference pressure.

As can be seen from the above description there is provided herein a simple inexpensive mechanical recorder which is completely self-contained. Means are provided for introducing a wide range of reference pressures into the housing of the instrument. In addition to the mode of operation described above the device described herein may also be used as a differential pressure recorder to measure the differential pressure between two unknown pressure sources. In this mode of operation one test pressure may be connected at opening 34 by means of a conventional fitting (not shown) and the other connected at valve 18 and movement of the piston will be indicative of the difference between the two test pressures.

What is claimed is:

1. A mechanical pressure sensor and recorder immersible in a fluid for measuring the total ambient pressure of the fluid comprising:
    a housing having first and second ends;
    a first end plate fastened at one end of, said housing and forming a closure therefor;
    means for sealing said first end plate in said housing;
    means attached to the external surface of said first end plate and extending therethrough into said housing for introducing a fluid into said housing at a predetermined pressure;
    drive means attached to the inner surface of said first end plate and having a rotatably driven shaft extending therefrom;
    a recording drum fixedly attached to said shaft for rotation therewith;
    a second end plate inserted in the other end of said housing and having an opening therethrough communicating with the ambient fluid;
    a piston slidably mounted within said housing and having one surface thereof in register with said opening in said second end plate and exposed directly to the ambient fluid from which is derived the total ambient pressure; and
    marking means attached to the internal face of said piston and movable therewith and in contact with said recording drum.

2. A mechanical pressure sensor recorder according to claim 1 wherein said marker means further comprises:
    latch means slidably mounted on said piston for mounting said marking means out of said contact with said drum; and
    means for disengaging said latch means to place said marking means in contact with the peripheral surface of said recording drum.

3. A mechanical pressure sensor and recorder according to claim 1 wherein said recording drum is a hollow cylinder open at the end opposite said shaft and said marking means is in contact with the inside surface of said cylinder.

4. A mechanical pressure sensor and recorder according to claim 3 wherein said marking means is a scribing marker, said scribing marker being capable of marking directly on the inside surface of said recording drum.

5. A mechanical pressure sensor and recorder according to claim 3 wherein said recording drum further comprises a paper insert attached to the inside surface of said drum for providing a removable marking surface thereon.

References Cited

UNITED STATES PATENTS

| | | | |
|---|---|---|---|
| 2,297,725 | 10/1942 | Spilhaus | 73—391 X |
| 2,816,440 | 12/1957 | Garrison | 73—419 X |
| 3,102,426 | 9/1963 | English | 73—419 |
| 3,104,928 | 9/1963 | Hester | 346—72 |
| 3,353,409 | 11/1967 | Gelbach | 73—419 |

RICHARD B. WILKINSON, *Primary Examiner.*

JOSEPH W. HARTARY, *Assistant Examiner.*

U.S. Cl. X.R.

73—398, 419; 346—127